United States Patent
Kutsch et al.

(10) Patent No.: US 7,600,654 B2
(45) Date of Patent: Oct. 13, 2009

(54) CONTAINER AND COOKWARE APPARATUS PROVIDING REST SUPPORT FOR UTENSILS

(75) Inventors: Duane B. Kutsch, New Albany, OH (US); Kimberly K. Besst, Johnstown, OH (US)

(73) Assignees: SEB S.A., Rumilly (FR); Groupe SEB USA, West Orange, NJ (US)

( * ) Notice: Subject to any disclaimer, the term of this patent is extended or adjusted under 35 U.S.C. 154(b) by 568 days.

(21) Appl. No.: 11/372,913

(22) Filed: Mar. 10, 2006

(65) Prior Publication Data

US 2007/0210094 A1    Sep. 13, 2007

(51) Int. Cl.
*B65D 25/00* (2006.01)
*B65D 1/40* (2006.01)

(52) U.S. Cl. .................... 220/756; 220/735

(58) Field of Classification Search ........... 220/735, 220/752, 573.1, 761, 762, 763, 764, 769, 220/574.1, 770; 215/391, 390; 248/37.6, 248/37.3; 16/111.1; D7/361
See application file for complete search history.

(56) References Cited

U.S. PATENT DOCUMENTS

| | | | | |
|---|---|---|---|---|
| 46,692 A | * | 3/1865 | Morse et al. | 248/37.6 |
| 148,355 A | * | 3/1874 | Dennett | 248/37.6 |
| 304,039 A | * | 8/1884 | Smith | 248/37.6 |
| 315,989 A | * | 4/1885 | Ziph | 222/467 |
| 1,074,441 A | * | 9/1913 | Lundahl | 30/327 |
| 1,237,504 A | | 8/1917 | Graham | |
| 1,258,742 A | * | 3/1918 | Bullen | 248/37.6 |
| 1,306,677 A | | 6/1919 | Anderson et al. | |
| 1,327,982 A | | 1/1920 | Burns | |
| 1,464,731 A | * | 8/1923 | Smith | 248/37.6 |
| 1,472,995 A | * | 11/1923 | Simone | 248/37.6 |
| 1,522,329 A | * | 1/1925 | Salucci | 220/763 |
| 1,554,887 A | | 9/1925 | Smith | |
| 2,034,940 A | | 3/1936 | Butler | |
| 2,368,898 A | * | 2/1945 | Swift, Jr. | 248/37.6 |
| 2,371,537 A | | 3/1945 | Mangini | |
| 2,493,751 A | | 1/1950 | Davis | |
| 2,530,470 A | | 11/1950 | Kenly | |
| 2,590,286 A | | 3/1952 | Wirtanen et al. | |
| 2,605,624 A | | 8/1952 | Halladay | |
| 2,742,771 A | | 4/1956 | Negaard | |
| 2,919,086 A | | 12/1959 | McMahan | |
| 3,931,668 A | * | 1/1976 | Hombach | 248/37.6 |
| 4,013,250 A | | 3/1977 | McGaffin | |
| 4,991,803 A | | 2/1991 | Buder | |
| 5,105,963 A | | 4/1992 | Scott | |
| 5,678,790 A | | 10/1997 | Dwyer | |
| 5,715,570 A | * | 2/1998 | Hyun | 16/110.1 |
| 5,823,483 A | | 10/1998 | Gaskill | |
| 5,829,342 A | * | 11/1998 | Lee | 99/348 |
| 5,924,592 A | | 7/1999 | Hieronymus | |
| 6,032,822 A | | 3/2000 | Munari | |
| D501,358 S | | 2/2005 | LoGiudice et al. | |

* cited by examiner

*Primary Examiner*—Anthony Stashick
*Assistant Examiner*—Robert J Hicks
(74) *Attorney, Agent, or Firm*—The Webb Law Firm

(57) ABSTRACT

Cookware containers providing a support to rest a utensil during cooking. Particularly, containers and cookware apparatuses configured to support a utensil when a portion of the utensil is cantilevered over the opening of the container.

13 Claims, 3 Drawing Sheets

CONTAINER AND COOKWARE APPARATUS PROVIDING REST SUPPORT FOR UTENSILS

TECHNICAL FIELD

The present invention relates generally to cookware containers providing a support to rest a utensil during use. More particularly, the present invention relates to containers and cookware apparatuses configured to support a utensil when a portion of the utensil is cantilevered over the opening of the container.

BACKGROUND OF THE INVENTION

The preparation of food can be a time consuming and messy process. Moreover, the complexity of certain recipes and dishes can create a cluttered atmosphere in the kitchen. Often times during the cooking process utensils are used during the preparation of the food. During use, these utensils collect residue from various food products, creating an inherent problem regarding the storage of the utensil when the utensil is still being used for the preparation of the food, and when the user needs to focus on other things (for example, preparation of other portions of the meal). Many times, the user leaves the utensil on the side of the stove leaving behind food residue which later needs to be cleaned. In other situations, the utensils may be left in the container with the food as it is being prepared. This, however, presents additional concerns because the utensil may be tipped or even knocked out of the container, thus causing potentially hot contents of the container to spill. This presents both a potentially dangerous and messy situation.

The present invention provides a solution to the current existing problems associated with the use of a utensil during the process of food preparation. The container and cookware apparatus are configured to provide a support member on which the utensil may rest upon after the utensil has been initially used. Once placed upon the support member, a utensil can be cantilevered over the opening in the container so that at least a portion of the utensil can be positioned over the food after the utensil's initial interaction with the food. This arrangement prevents residue left on the utensil from its initial exposure to the food from getting anywhere else during the remainder of the food preparation process (including, for example, the stove top, countertop, floor, etc.), thus minimizing messes. Moreover, the utensil is not likely to be easily tipped or knocked over, which diminishes the likelihood of accidentally spilling the contents within the container.

SUMMARY OF THE INVENTION

Accordingly, it is an object of the present invention to provide containers having support members for utensils.

In one exemplary embodiment, a container includes a support member rotatably attached to a handle portion of the container. The support member is configured to receive and cantilever at least a portion of a utensil over the container.

In another exemplary embodiment, a cookware apparatus includes a container and a support member. The container has a base, an outer wall and a handle portion. The outer wall extends upwardly from an outer periphery of the base to define an opening in the container. The handle portion extends outwardly from the outer wall of the container and is configured to be held by a user. The support member is rotatably attached to the handle portion of the container. The support member is configured to receive and position at least a portion of a cooking utensil over the opening of the container.

The present containers and cookware provide a simple way to allow a user to store a utensil being used during the food preparation process by placing the utensil on a container presently being used, thus providing a mechanism to support a utensil and cantilever the portion of the utensil contacting the food over an opening of the container.

These and additional advantage of the present invention will be more readily apparent in view of the following detailed description.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Exemplary embodiments of the present invention and its operation are hereinafter described in detail in connection with views and examples of FIGS. 1-4, wherein like numbers indicate the same or corresponding elements throughout the views.

Figure 1:
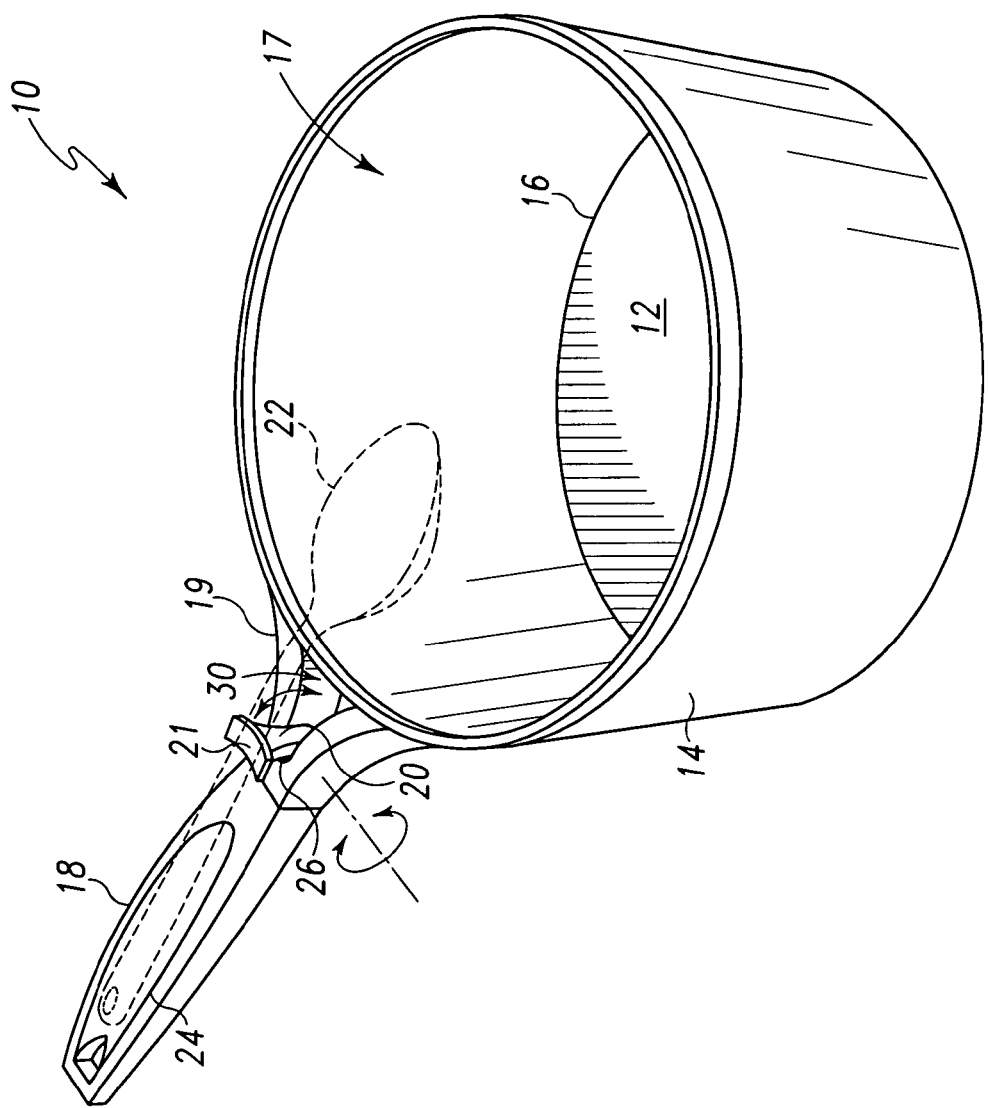
FIG. 1 depicts an isometric view of an exemplary embodiment of a container having a utensil (shown in phantom) resting upon a support member in an upright position.

FIG. 1 illustrates an exemplary embodiment of a container 10 (i.e., a pot, a pan, etc.). The container 10 includes a base 12, an outer wall 14 and a handle portion 18. The outer wall 14 extends upwardly from an outer periphery 16 of the base 12 to define an opening 17 in the container 10. The handle portion 18 extends outwardly from at least one section of the outer wall 14 of the container 10. The handle portion 18 is configured to be held by a user. As further shown in FIG. 1, a support member 20 is rotatably attached to the handle portion 18 of the container 10. The support member 20 is configured to receive and cantilever at least a portion of a utensil 22 (shown in phantom) over the opening 17 of the container 10. In one exemplary embodiment the utensil 22 can include a spoon (it is important to note that in other exemplary embodiments the utensil 22 can be any type of utensil including, for example, a fork, knife, spork, prongs, etc.). It is important to note that in some exemplary embodiments, for example, as shown in FIG. 1, a second portion of the utensil 22 rests upon another section of the handle portion 18. In fact, in one exemplary embodiment, the handle portion 18 can include a depressed region 24 providing a surface to help support a utensil 22 in combination with the support member 20. Also shown in the exemplary embodiment of FIG. 1, the support member 20 is attached to the handle portion 18 at the point in which the handle portion 18 connects to the container 10. This point of contact in which the handle portion 18 connects to the outer wall 14 of the container 10 is referred to as the handle tang 19.

The support member 20 being rotatably attached to the handle portion 18 is capable of pivoting between at least two positions. As shown in the exemplary embodiment of FIG. 1, the support member 20 is pivoted to an upright position such as to position the support member 20 to receive a utensil 22. The support member 20 has an outer surface 21 on which the utensil 22 can rest. In one exemplary embodiment, the outer surface 21 has a concave configuration. This concave configuration provides increased support to the utensil 22 when the utensil 22 is positioned to be rested upon the container 10. The support member 20 as shown in this exemplary embodiment of FIG. 1 is a solid material that provides adequate and sufficient support for any utensil that may need to be cantilevered over the opening 17 of the container 10. In another exemplary embodiment, the support member 20 can be formed from other types of materials.

As shown in the exemplary embodiment of FIG. 1, a portion of the utensil 22 is cantilevered over the opening 17 of the container 10. The advantage of providing the capability of cantilevering a utensil 22 over the container 10 is particularly important during the preparation of food. Utilizing the utensil 22 by stirring or mixing food within the container 10 generally leaves residual material (not shown) on the utensil 22. The support member 20 on the container 10 provides a mechanism and a location to store the utensil 22 while cantilevering the utensil 22 over the opening 17 of the container 10. When the support member 20 is in the upright position in one exemplary embodiment, a stopper 26 attached to the support member 20 can be configured to interface with the handle portion 18 to prevent movement of the support member 20 when the support member 20 is pivoted to the upright position. When the stopper 26 contacts the handle portion 18, the user is informed that the support member 20 is in the full upright position and ready to receive a utensil 22 in which to provide support.

Figure 2:
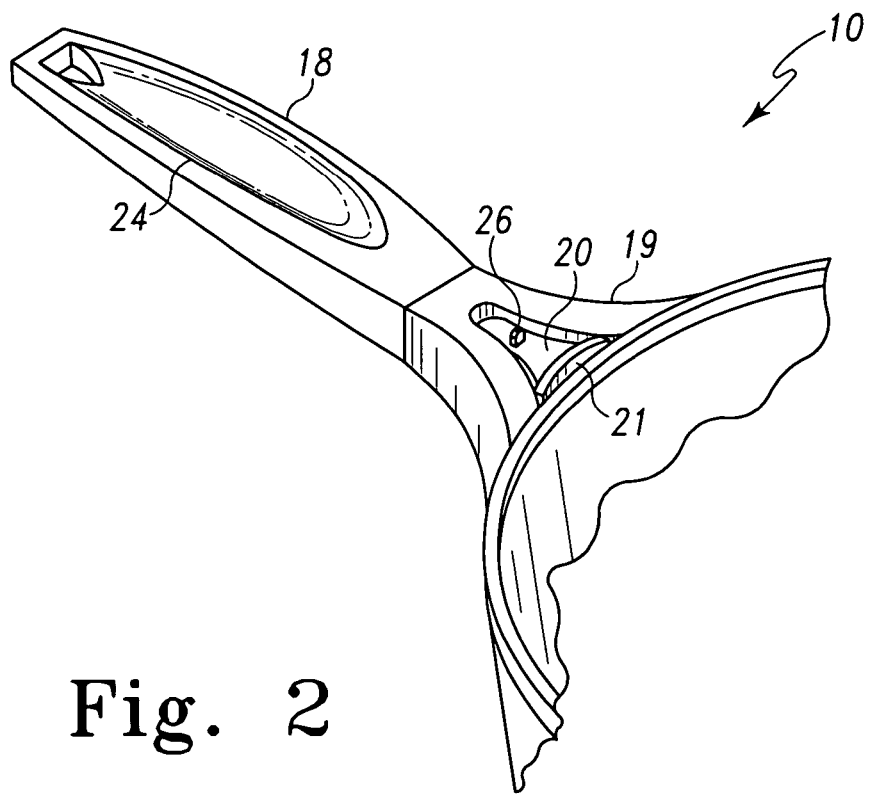
FIG. 2 illustrates an isometric view of an exemplary embodiment of a support member in a downward position in a handle portion of a container.

In the exemplary embodiment as shown in FIG. 2, the container 10 is shown having the support member 20 rotatably attached to the handle portion 18 in a second position (i.e., the downward position). The support member 20 is in the downward position when the support member 20 is not in use, as opposed to the upright position which is when the support member 20 is ready to receive the utensil (not shown in FIG. 2). In one exemplary embodiment, the support member 20 can lockably engage the handle portion 18 of the container 10 at both the upright and downward positions. In one exemplary embodiment, when the support member 20 is in the downward position, the support member 20 lies within a recessed region 30 contained within the handle portion 18. The recessed region 30 is configured to accept the support member 20 such that the support member 20 lies substantially flat and coextensive with the planar surface of the handle portion 18.

Figure 3:
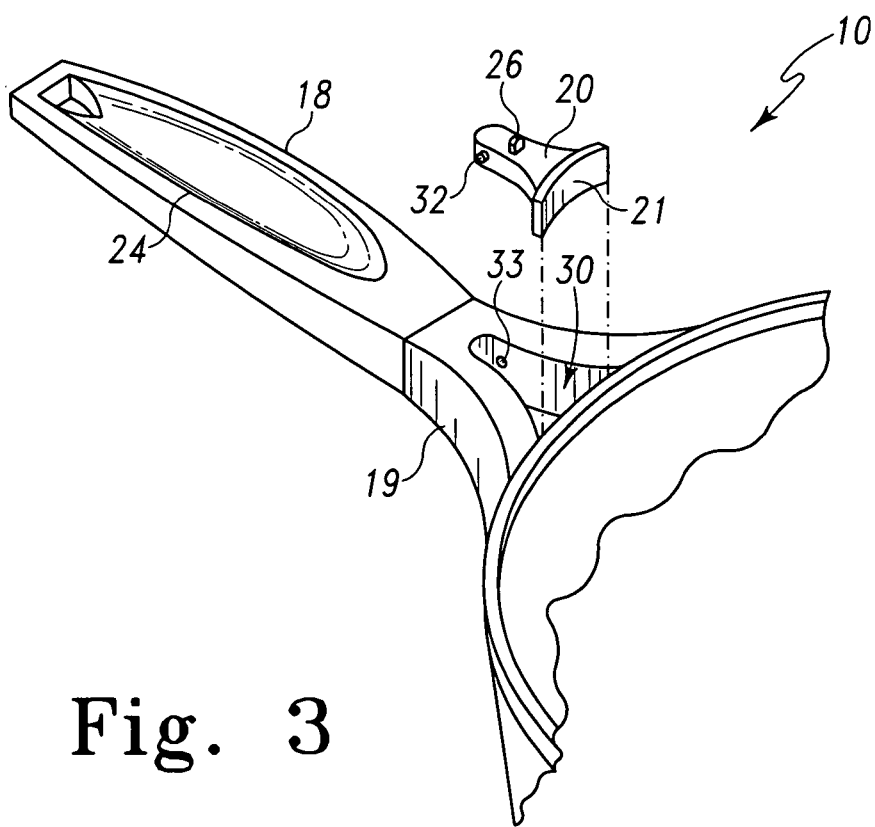
FIG. 3 depicts an isometric view of an exemplary embodiment of the support member in partial exploded view removed from a handle portion of a container.

The exemplary embodiment of FIG. 3 illustrates how the support member 20 is capable of pivoting between at least two positions. Tab portions 32 integrated with the support member 20 are positioned at the bottom portion 34 of the support member 20 along each side 36 of the support member 20. These tab portions 32 are inserted into recesses 33 contained within the handle portion 18 and permit the rotatable movement of the support member 20 between the at least two positions. In another exemplary embodiment, the support member 20 can be removed and replaced in case of breakage or overuse.

Figure 4:
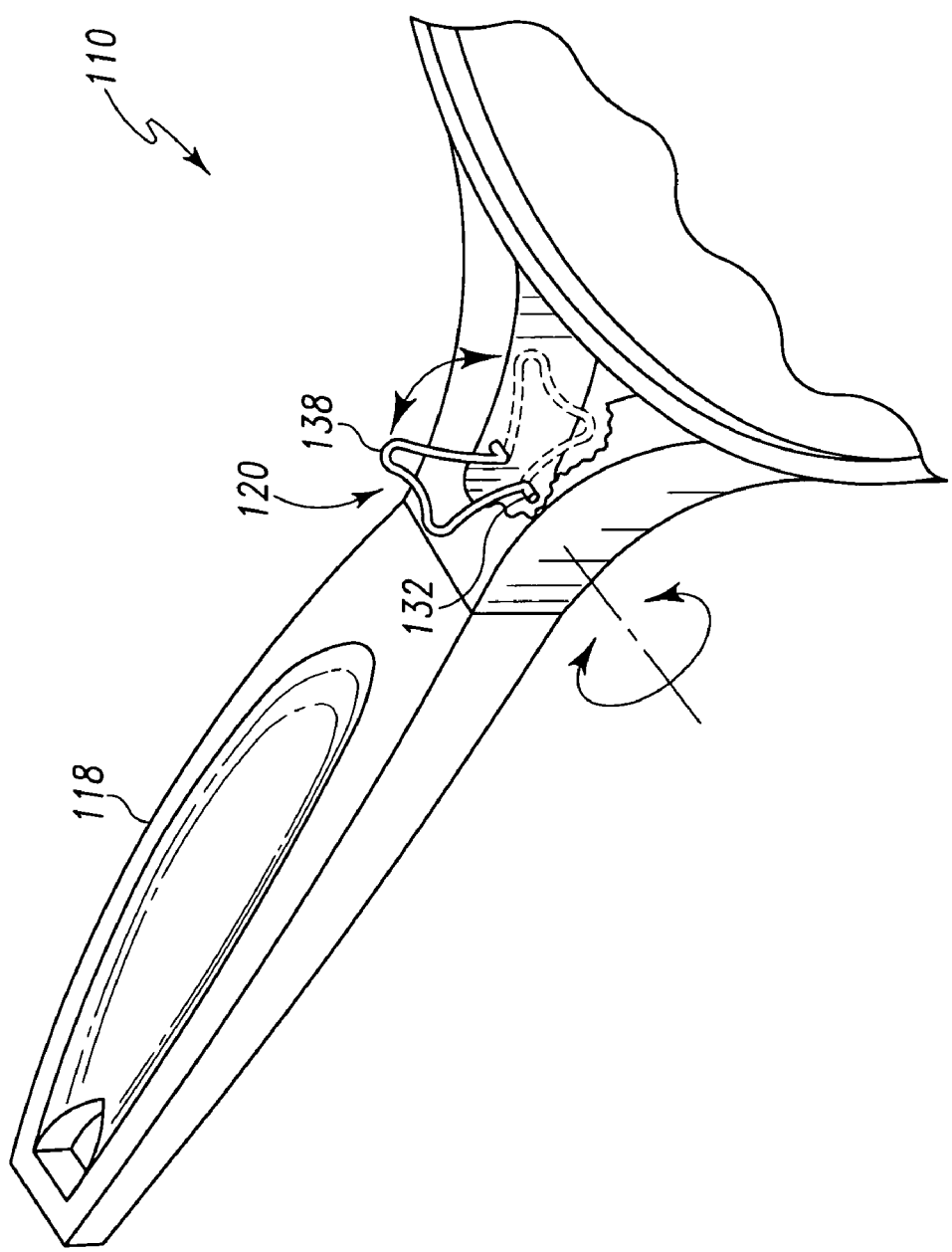
FIG. 4 illustrates an exemplary embodiment of a support member where the support member includes a wire frame.

In the exemplary embodiment as shown in FIG. 4, the support member 120 can be made of a single piece of material providing a wire frame structure 138. The wire frame structure 138 has tab portions 132 which insert into recesses (not shown) contained within the handle portion 118 of the container 110. The wire frame structure 138 is also configured to pivot between at least two positions allowing for the support member 120 to be in at least an upright position and a downward position depending on whether the container 110 and support member 120 are in use.

It is important to note, that the support member as indicated herein can be made of a variety of materials. As shown in FIG. 4, the support member can be made from a wire frame, however, componentry can be made of any material that is suitable for use with cookware and containers generally used for the preparation of food products.

While the invention has been so described in detail with reference to specific embodiments thereof, it will be imperative to those skilled in the art that various changes and modifications may be made therein without departing from the spirit of the invention, the scope of which is defined by the following claims.

We claim:

1. A container comprising:
    a gripping handle portion and a handle tang connected to the gripping handle portion; and
    a support member rotatable with respect to the handle tang along a longitudinal axis of the handle tang from an upright position to a downward position, wherein said support member is configured to receive and cantilever at least a portion of a utensil over said container in the upright position, and wherein the support member is fully disposed within the handle tang in the downward position.

2. The container as recited in claim 1, wherein said support member is rotatable between at least two positions, wherein said support member is configured to receive and cantilever a utensil when said support member is at one of said positions.

3. The container as recited in claim 2, wherein said support member is configured to lockably engage the handle portion at each of said positions.

4. The container as recited in claim 1, wherein said support member comprises an outer surface configured to receive a utensil.

5. The container as recited in claim 4, wherein said outer surface comprises a substantially concave configuration.

6. The container as recited in claim 1, wherein said handle tang is configured to connect said handle portion to an outer wall of said container.

7. The container as recited in claim 2, wherein said handle portion comprises a recessed region configured to contain said support member in one of said positions.

8. The container as recited in claim 1, wherein said support member comprises a wire frame.

9. A cookware apparatus comprising:
    a container having a base, an outer wall, a gripping handle portion and a handle tang connected to the gripping handle portion and the outer wall, wherein said outer wall extends upwardly from an outer periphery of said base to define an opening in said container, and wherein said handle portion extends outwardly from said outer wall of said container and is configured to be held by a user; and
    a support member rotatable with respect to the handle tang along a longitudinal axis of the handle tang from an upright position to a downward position, wherein said support member is configured to receive and position at least a portion of a cooking utensil over the opening of said container in the upright position, and wherein the support member is fully disposed within the handle tang in the downward position.

10. The cookware apparatus as recited in claim 9, wherein said support member is rotatable between at least two positions, wherein said support member is configured to receive and cantilever a utensil when said support member is at one of said positions.

11. The cookware apparatus as recited in claim 9, wherein said handle portion includes a depressed region providing a surface to help support said utensil in combination with said support member.

12. The cookware apparatus as recited in claim 10, wherein said handle portion comprises a recessed region configured to contain said support member in one of said positions.

13. The cookware apparatus as recited in claim 12, wherein said support member is located at least partially within said recessed portion of the said handle portion when said support member is in said one of said positions.

* * * * *

UNITED STATES PATENT AND TRADEMARK OFFICE
CERTIFICATE OF CORRECTION

PATENT NO.       : 7,600,654 B2                              Page 1 of 1
APPLICATION NO.  : 11/372913
DATED            : October 13, 2009
INVENTOR(S)      : Kutsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Fifth Day of October, 2010

David J. Kappos
*Director of the United States Patent and Trademark Office*